United States Patent [19]
Nogi et al.

[11] Patent Number: 5,806,490
[45] Date of Patent: Sep. 15, 1998

[54] FUEL CONTROL SYSTEM FOR A GASEOUS FUEL INTERNAL COMBUSTION ENGINE WITH IMPROVED FUEL METERING AND MIXING MEANS

[75] Inventors: Toshiharu Nogi, Novi; Robert I. Bruetsch, Whitmore Lake, both of Mich.

[73] Assignee: Hitachi America, Ltd., Research and Development Division, Tarrytown, N.Y.

[21] Appl. No.: 770,261

[22] Filed: Dec. 20, 1996

Related U.S. Application Data

[62] Division of Ser. No. 646,435, May 7, 1996, Pat. No. 5,692,478.

[51] Int. Cl.$^6$ .................................................. F02D 41/14
[52] U.S. Cl. .......................... 123/435; 123/527; 123/674; 123/679
[58] Field of Search .................................. 123/527, 674, 123/679, 435, 704, 14

[56] References Cited

U.S. PATENT DOCUMENTS

| | | | |
|---|---|---|---|
| 5,197,450 | 3/1993 | Kitajima et al. | 123/1 A |
| 5,226,396 | 7/1993 | Bailey | 123/704 |
| 5,255,661 | 10/1993 | Nankee, II et al. | 123/674 |
| 5,333,951 | 8/1994 | Korsmeier et al. | 123/527 |
| 5,400,762 | 3/1995 | Fodale et al. | 123/674 |
| 5,666,923 | 9/1997 | Collier, Jr. et al. | 123/527 |
| 5,704,339 | 1/1998 | Choe et al. | 123/674 |

OTHER PUBLICATIONS

M. Ishii, et al., "Experimental Studies on a Natural Gas Vehicle," SAE Paper No. 942005 (1994).

S.H. Smith, L.E. Gettel, "A Compressed Natural Gas Mass Flow Driven Heavy Duty Electronic Engine Management System," SAE Paper No. 931822 (1993).

*Primary Examiner*—Erick R. Solis
*Attorney, Agent, or Firm*—Gifford, Krass, Groh, Sprinkle, Patmore, Anderson & Citkowski, P.C.

[57] ABSTRACT

A fuel management system for a gaseous fuel internal combustion engine is disclosed in which a mass air flow sensor as well as a mass gas flow sensor provide input signals to an electronic control unit (ECU) which then determines the air/fuel ratio. The ECU in turn generates output signals to a fuel valve to control the mass of fuel flow to the engine and thus the air/fuel ratio. A turbocharger bypass valve, a precooler for the gaseous fuel supply, a pressure accumulator upstream from the fuel valve, as well as a system to calibrate the engine to the specific gaseous fuel is described to enhance the accuracy of the fuel management system. An improved pressure balanced valve for controlling the fuel flow to the engine is also provided as well as a cylinder pressure transducer to optionally provide an output signal to the ECU to determine the air/fuel ratio.

15 Claims, 9 Drawing Sheets

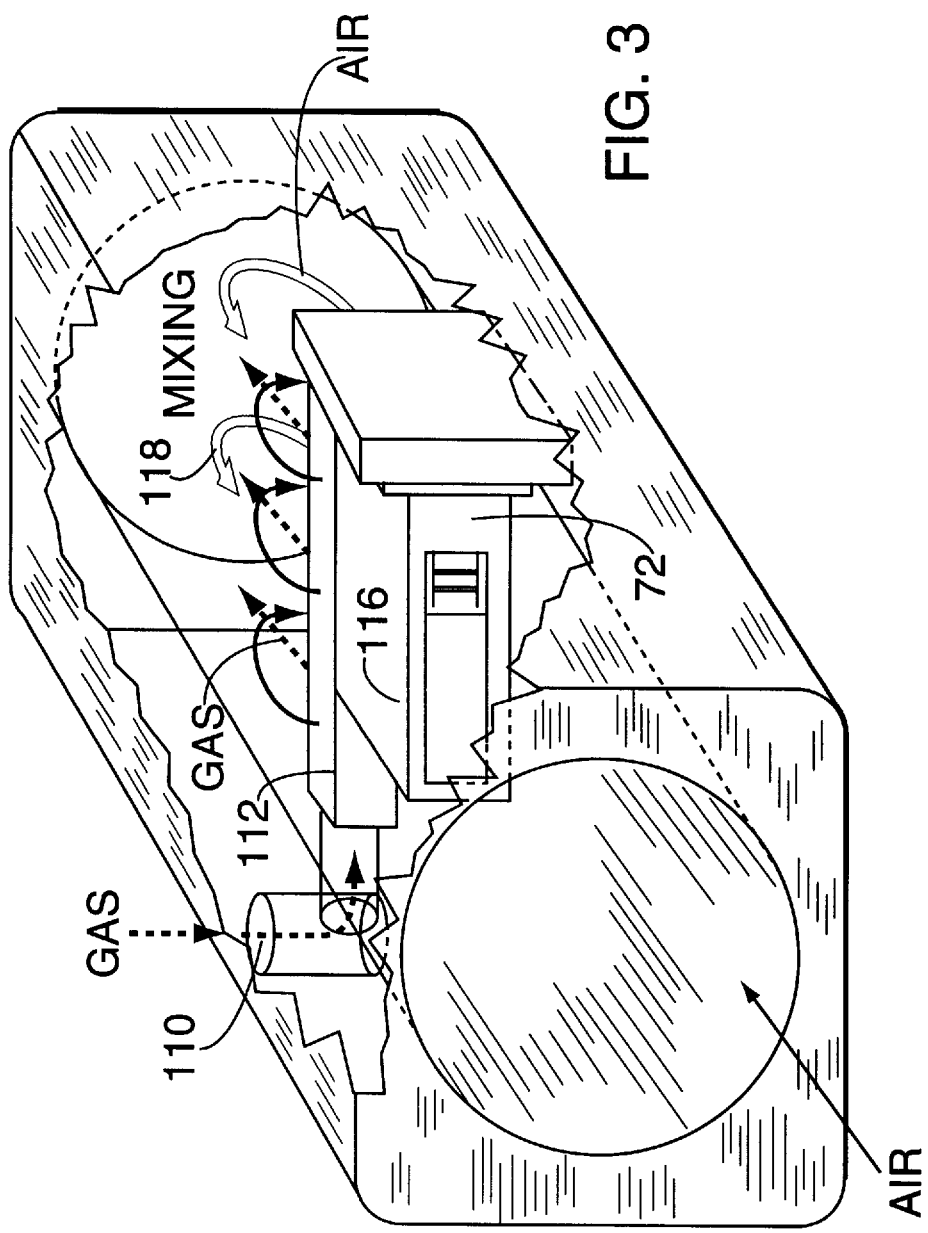

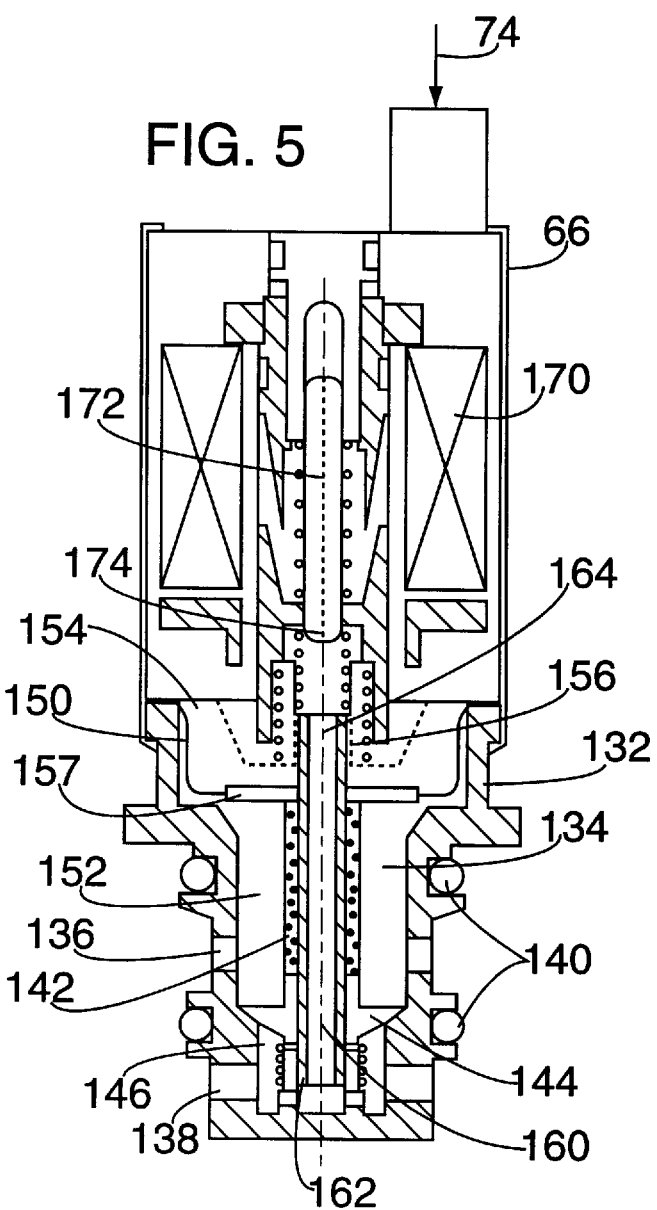

FUEL CONTROL SYSTEM FOR A GASEOUS FUEL INTERNAL COMBUSTION ENGINE WITH IMPROVED FUEL METERING AND MIXING MEANS

This is a divisional of application Ser. No. 08/646,435, filed May 7, 1996, now U.S. Pat. No. 5,692,478.

BACKGROUND OF THE INVENTION

I. Field of the Invention

The present invention relates generally to fuel management systems for internal combustion engines and, more particularly, to such a fuel management system for a gaseous fuel internal combustion engine.

II. Description of the Prior Art

In order to obtain optimum engine performance, modern day internal combustion engines of the type, for example, used in automotive vehicles, monitor the air/fuel ratio of the fuel charge to the engine and modify the air/fuel ratio by controlling the fuel supply to obtain the desired engine performance. Such monitoring of the air/fuel ratio is necessary not only to obtain the best fuel economy, but also to meet engine emission requirements typically dictated by government authority.

In order to maximize fuel economy and minimize engine emissions, there has been a modern trend to employ gaseous fuels, such as compressed natural gas (CNG), liquid natural gas (LNG) and liquid petroleum gas (LPG). Such gaseous fuels not only provide good fuel economy and low engine emissions, but also enjoy better cold starting of the engine.

There have been several previously known systems for monitoring the air/fuel ratio in a gaseous fuel internal combustion engine. In one system, an oxygen sensor is positioned in the exhaust stream from the engine and generates an output signal representative of the amount of oxygen in the exhaust gas stream. Since essentially all of the oxygen is utilized at stoichiometric conditions, the oxygen sensor so senses the absence of oxygen and provides the appropriate signal to the electronic control unit (ECU) for the engine.

One disadvantage of this previously known type of fuel management system is that the oxygen sensor maintains its accuracy only at or very near stoichiometric combustion conditions. In many situations, however, it is desirable to operate the engine under a lean fuel condition for better fuel economy. The previously known fuel systems which utilize the oxygen sensor in the exhaust gas chamber, however, are not sufficiently accurate to monitor the air/fuel ratio to the engine during a lean combustion condition. Such inaccuracy, furthermore, is unacceptable in view of the continually increasingly stringent governmental regulations. Furthermore, such sensors lacked the durability to last as long as the engine was in service.

In a still different type of fuel management system of the type disclosed in U.S. Pat. No. 5,353,765 which issued Oct. 11, 1994 to Saikalis et al. and which is commonly owned by the assignee of this patent, a mass air flow sensor is positioned within the air intake to the engine and, similarly, a mass gas or fuel flow sensor is provided in the fuel supply passageway. Both the gas and fuel flow sensors provide output signals representative of the mass gas flow through the sensors to the ECU. The ECU then utilizes the input signals from both mass air flow sensor and mass fuel flow sensor to calculate the air/fuel ratio. The ECU then generates output signals to a fuel valve connected in series with the fuel supply passageway to control the amount of fuel provided to the engine. Since the ECU receives input signals representative of the mass fuel and mass air flow into the engine, theoretically the ECU is able to control the fuel flow into the engine in order to achieve any target air/fuel ratio. In practice, however, such accurate control of the air/fuel ratio for the engine cannot be obtained for a variety of reasons.

One problem with this previously known fuel management system is that such engine systems typically utilize a turbocharger to compress the air in the intake manifold passageway and in which the air flow sensor is positioned upstream from the turbocharger. During an engine's acceleration condition, however, the throttle closes and creates not only a back pressure, but even a reverse flow in the intake passageway and thus through the mass air flow sensor. Such back pressure and/or reverse flow provide false readings from the mass air flow sensor to the ECU.

A still further disadvantage of this previously known system is that volumetric efficiency varies as a function of the temperature of the gaseous fuel. Because gas' volume is changed by the temperature as opposed to liquid fuel.

A still further disadvantage of this previously known system when the fuel valve is operated in a fuel injection mode, i.e. pulsed opening of the valve in synchronism with the engine fuel combustion, is that the repeated opening and closure of the fuel valve creates a back pressure in the fuel passageway each time the valve is closed. This back pressure is sensed by the mass fuel flow sensor typically positioned upstream from the fuel valve. Such back pressure results in erratic output signal from the mass fuel flow sensor and the resultant inaccurate calculations by the ECU of the air/fuel ratio.

A still further disadvantage of these previously known gaseous fuel systems is that gaseous fuel, unlike liquid gasoline, is less standardized in its composition and energy content. Rather, such gaseous fuel is typically compressed and "bottled" as it is removed from the ground. Consequently, since there is no post treatment or standardization of the composition and density of the gaseous fuel, such composition and density of the fuel varies from one source to the next. Consequently, the point of stoichiometric combustion will vary between different fuel sources even at identical air/fuel ratios.

SUMMARY OF THE PRESENT INVENTION

The present invention provides a fuel management system for a gaseous fuel internal combustion engine which overcomes all of the above-mentioned disadvantages of the previously known systems.

In brief, in the present invention, a mass air flow sensor is positioned within the air intake passageway to the engine while, similarly, a mass fuel or mass gas flow sensor is positioned in a fuel supply passageway between a source of compressed gaseous fuel and the air intake. Both sensors, furthermore, provide output signals representative of the mass air or gas flow through the sensor to an electronic control unit (ECU). The ECU then generates output signals to a fuel valve positioned in series in the fuel supply passageway to selectably control the amount of fuel provided to the engine and thus control the air/fuel ratio of the engine.

In order to improve fuel efficiency as well as reduce emissions, a turbocharger is also positioned in series with the air intake upstream from the mass air flow sensor. An oxygen sensor is also positioned in the exhaust gas stream from the engine and provides an output signal to the ECU representative of the amount of oxygen in the exhaust gas stream.

In order to minimize back pressure and reverse flow in the air intake passageway during an engine deceleration condition, a bypass valve is preferably positioned between the turbocharger intake and the outlet from an intercooler downstream from the turbocharger outlet. This bypass valve is normally closed. However, in the event that the manifold vacuum exceeds a threshold value, indicative of a closed throttle condition, the bypass valve opens and allows the air from the intercooler outlet to recycle to the turbocharger intake. In doing so, back pressure and reverse flow through the air intake passageway is minimized, together with the previously known inaccurate readings from the mass air flow sensor.

In order to prevent volumetric efficiency decreases caused by fluctuations in the temperature of the fuel, the present invention also provides a heat exchanger in series with the fuel supply passageway upstream from the mass fuel flow sensor. The heat exchanger assures that the temperature of the fuel flowing through the mass fuel flow sensor is substantially constant thereby preventing volumetric efficiency decreases caused by fluctuations in the fuel temperature.

In the conventional fashion, a fuel supply valve is fluidly positioned in series in the fuel supply passageway. The ECU provides output signals to control the position of the valve in order to variably open the valve and thus vary the amount of fuel supply to the engine. Where the engine is a fuel injection engine, i.e. the fuel valve is opened in synchronism with the engine combustion to provide short pulses of fuel to the engine, the repeated opening and closure of the fuel valve can provide back pressure to the mass fuel flow sensor typically positioned upstream from the fuel supply valve. In order to minimize such back pressure, the present invention provides an accumulator between the valve and the mass fuel flow sensor in order to minimize such pressure fluctuations. Alternatively, a one way valve is positioned between the mass fuel flow sensor and the fuel valve.

The present invention further includes an improved integrated air flow sensor and air/gas mixing unit. The integration of the air flow sensor as well as the air/gas mixing unit, not only minimizes weight and manufacturing costs, but also provides better air/gas mixing than previously obtainable.

The utilization of a cylinder pressure sensor in conjunction with an air flow sensor is also disclosed in which both the air flow sensor and cylinder pressure sensor provide output signals to the ECU. The ECU by utilizing these output signals calculates the air/fuel ratio and controls the fuel supply valve to obtain the target air/fuel ratio. The use of the cylinder pressure sensor thus obviates the need for a separate mass fuel flow sensor or, alternatively, the mass air flow sensor.

An improved pressure balanced metering valve for the fuel supply valve is also disclosed in which differential pressure across a diaphragm is utilized to control the fuel supply to the engine. A solenoid operates in conjunction with a fluid passageway formed through a valve member in the valve assembly to control the pressure differential across the diaphragm. Consequently, the pressure differential across the diaphragm, rather than the position of the solenoid, actuates the valve member thus minimizing the power consumption of the solenoid. A further advantage of utilizing the improved gas metering valve of the present invention is that the pressure differential across the diaphragm is controlled in part by the pressure in the air intake passageway. As such, fuel flow variations through the fuel valve previously caused by variations of the pressure of the intake manifold are at least minimized if not altogether eliminated.

The present invention also provides a system for calibrating the engine for the particular gaseous fuel during the initial operation of the engine. In brief, during a first engine idle after engine warm up, the ECU controls the fuel supply valve so that the engine combustion dithers around a stoichiometric air/fuel ratio. Each time stoichiometric combustion is attained as sensed by an oxygen sensor in the exhaust gas stream, the ratio of the output values from the mass air flow sensor and mass gas flow sensor are stored by the ECU. After a predetermined time period, the ECU calculates an average output signal from both the mass air flow sensor and mass gas flow sensor at stoichiometric combustion. Thereafter, the ECU utilizes this calculated stoichiometric air/fuel ratio value to control the fuel supply valve to attain a target air/fuel ratio, such as a lean air/fuel ratio.

Still further improvements in the invention will become apparent of reading of the following detailed description.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 3 is a diagrammatic view of the integrated air sensor and air/fuel mixing unit;

FIG. 5 is a longitudinal sectional view illustrating a preferred embodiment of the metering valve of the present invention;

DETAILED DESCRIPTION OF A PREFERRED EMBODIMENT OF THE PRESENT INVENTION

Figure 1:
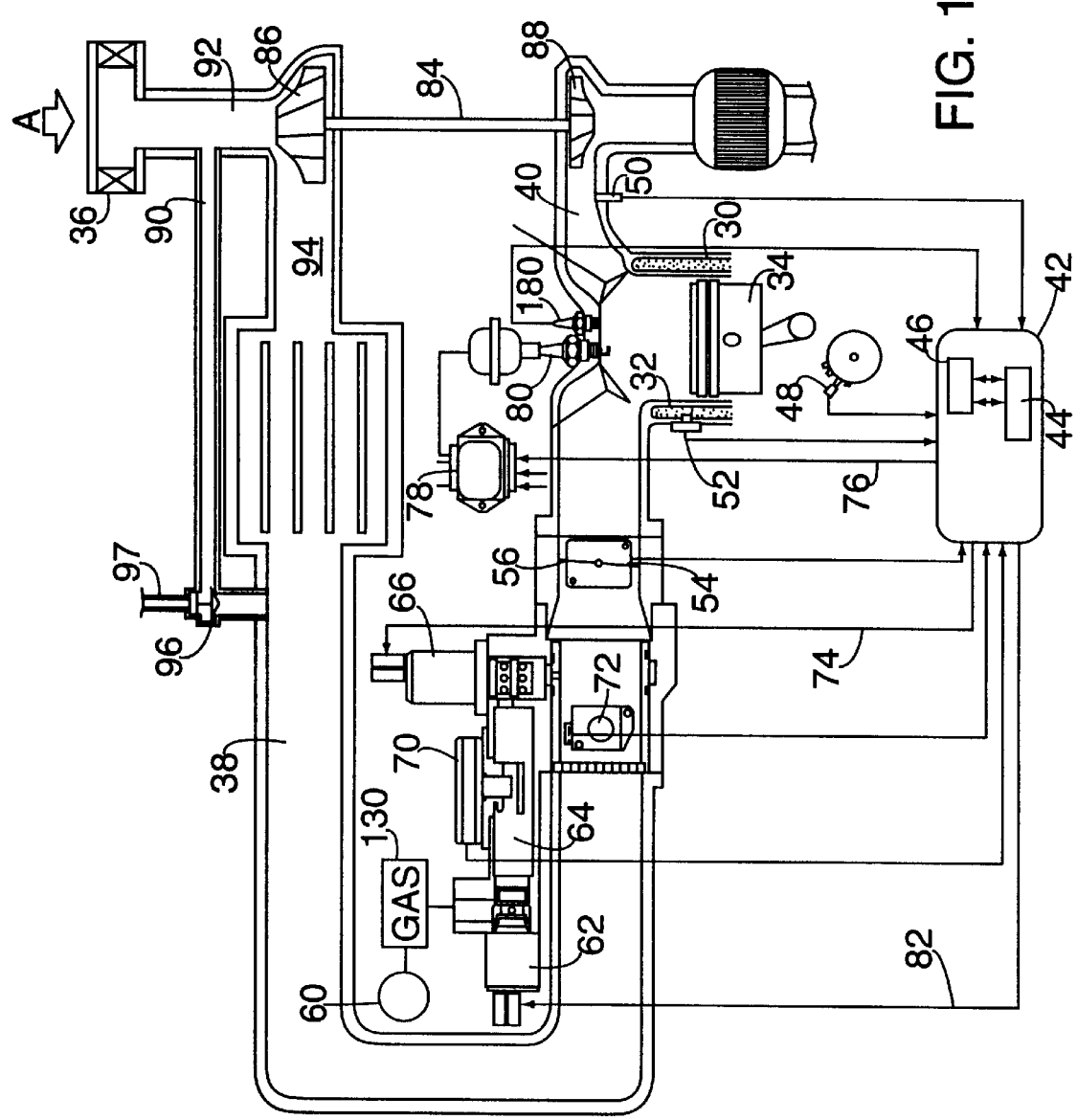
FIG. 1 is a schematic view illustrating a preferred embodiment of the fuel management system of the present invention.

With reference first to FIG. 1, a schematic view of a preferred embodiment of the fuel management system for a gaseous fuel engine 30 is there shown in which the engine 30 includes at least one cylinder 32 having a piston 34 reciprocally mounted within the cylinder 32. Air is inducted into the engine cylinder 32 through an air filter 36 and an air intake passageway 38. After combustion, the combustion products from the engine cylinder 32 are exhausted out through an exhaust passageway 40 in the conventional fashion.

The fuel management system includes an electronic control unit (ECU) 42 for controlling fuel delivery to the engine cylinders 32 in a fashion hereinafter described in greater detail. The ECU 42 preferably includes a microprocessor 44 having access to computer memory 46 which not only contains the program to operate the microprocessor 44, but also random access memory to store variables during the execution of the program by the microprocessor 44.

The ECU 42 receives a plurality of input signals representative of various engine parameters. In particular, the ECU receives an input signal from a crank shaft rotational position sensor 48 which, of course, is indicative of the position of the piston(s) 34 in the engine cylinder(s) 32.

The ECU 42 also receives as an input signal, the output signal from an oxygen sensor 50 which is positioned in the exhaust gas passageway 40. The oxygen sensor 50, furthermore, provides an output signal representative of the amount of oxygen in the exhaust gas stream flowing through the exhaust passageway 40. Furthermore, the oxygen sensor 50 generates a predetermined output signal, e.g. 500 millivolts, whenever the engine 30 achieves stoichiometric combustion.

A coolant temperature sensor 52 also provides an input signal to the ECU 42 representative of the temperature of the engine coolant. Likewise, a throttle position sensor 54 provides an input signal to the ECU 42 representative of the position of an engine throttle 56 positioned in series with the air intake passageway 38.

Still referring to FIG. 1, a source of pressurized gaseous fuel 60 is fluidly connected through a pressure regulator/shut off valve 62 to a fuel supply passageway 64. A fuel metering valve 66, which will be subsequently described in greater detail, is provided in series between the fuel supply passageway 64 and the air intake 38. Thus, when the fuel metering valve 66 is open, fuel flows from the pressurized gaseous fuel source 60, through the passageway 64 and into the air intake 38 whereupon the fuel and air are intermixed together prior to introduction into the engine cylinders 32.

A mass gas or mass fuel flow sensor 70 is positioned within the fuel supply passageway 64 and provides an output signal to the ECU 42 representative of the mass of fuel flowing through the passageway 64 and thus flowing to the engine cylinder(s) 32. Similarly, a mass air flow sensor 72 is positioned within the air intake passageway 38 upstream from the outlet of the fuel metering valve 66 and generates an output signal to the ECU 42 representative of the mass air flow through the air intake 38 and thus the mass air flow to the engine 30.

The ECU 42 also generates a number of output signals necessary to control the fuel supply to the engine as well as the engine combustion. Ideally, the ECU 42 controls the fuel supplied to the engine at a target air/fuel ratio which maximizes fuel economy and minimizes the creation of noxious emissions.

In particular, the ECU 42 sends an output signal along line 74 to control the actuation of the fuel metering valve 66. Similarly, the ECU provides an output signal along line 76 to a spark ignition module 78 which in turn controls the firing of a spark plug 80 in the cylinder 32. The ECU 42 also controls the activation of the pressure regulator/shutoff valve 62 for the pressurized fuel source 60 via output line 82.

Still referring to FIG. 1, in the preferred embodiment of the invention, a turbocharger assembly 84 is provided for increasing the amount of air to the engine 30. The turbocharger assembly 84 includes a compressor fan 86 positioned within the air intake passageway 38 between the air intake 36 and the mass air flow sensor 72. In the conventional fashion, a driven fan 88 is positioned within the exhaust passageway 40 which rotatably drives the compressor fan 86.

During a nondeceleration engine condition, the turbocharger 34 provides increased air through the air intake passageway 38 and through the mass air flow sensor 72 in the desired fashion. However, in the event of engine deceleration, the throttle 56 closes thus stopping air flow past the throttle 56. However, even during deceleration, the rotation of the turbocharger fan 86 continues through inertia which otherwise would result in back flow through the air intake passageway 38. Such back flow can result in inaccurate output signals from the mass air flow sensor 72.

In order to eliminate or at least minimize such back flow, the present invention provides a bypass passageway 90 extending between the compressor intake 92 and the intercooler outlet 38. A normally closed bypass valve 96 is positioned within the bypass passageway 90. This bypass valve 96 opens only when the vacuum in line 97 falls below a predetermined amount indicative of a closed throttle engine deceleration condition. When such deceleration occurs, the valve 96 is moved to its open position thus allowing air to recirculate from the intercooler outlet 38 through the bypass passageway 90 into the turbocharger compressor inlet 92 thus eliminating back flow through the mass air flow sensor 72.

The bypass valve 96 can be of any conventional construction. However, in the preferred embodiment, the bypass valve 96 is normally closed through the force of a compression spring forcing a valve in the passageway 90 against its associated valve seat.

Figure 2:
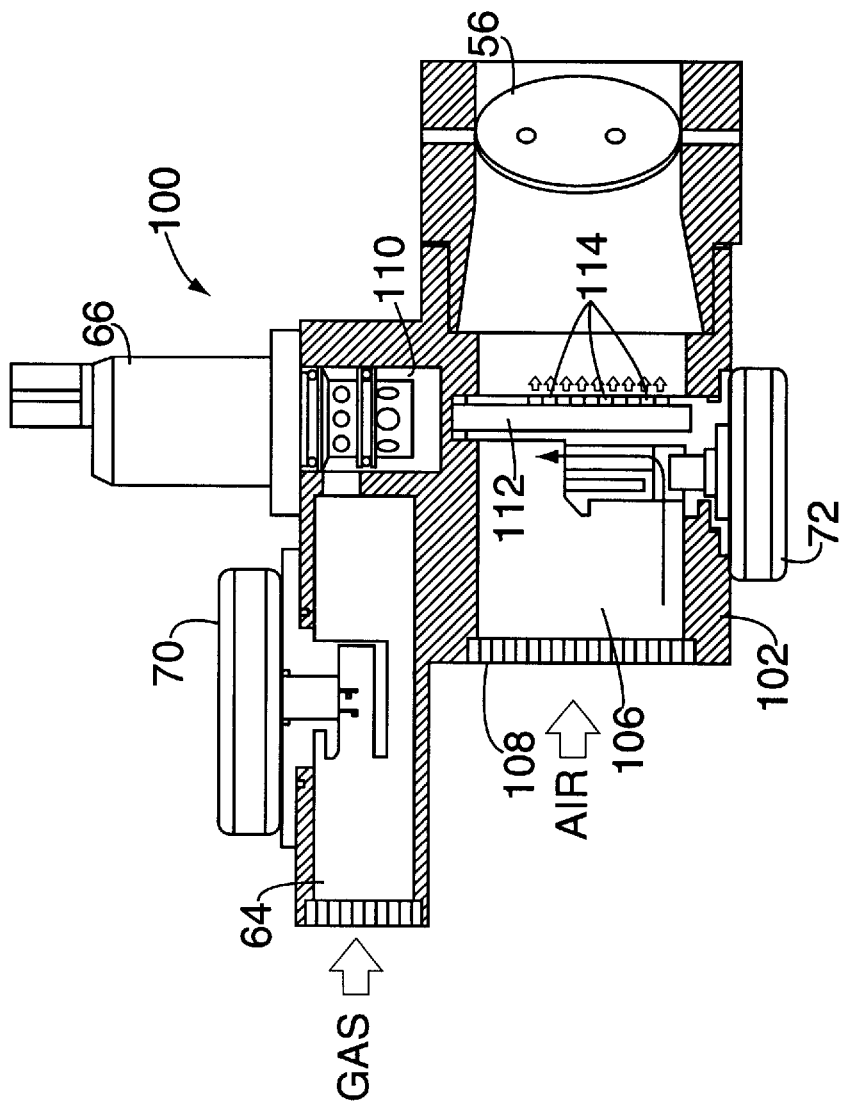
FIG. 2 is a sectional view illustrating a preferred embodiment of the integrated sensor and air/fuel mixing unit.

With reference now to FIGS. 2 and 3, the present invention further comprises an improved integrated mass air flow sensor, mass gas flow sensor and air/gas mixing unit 100. The integrated unit 100 includes a housing 102 having a through passageway 106 which forms a part of the air intake passageway. A honeycomb baffle 108 is provided across the inlet end of the throughbore 106 to ensure that laminar flow occurs through the passageway 106.

The integrated unit 100 also forms a part of the fuel supply passageway 64 in which the mass fuel flow sensor 70 is positioned. The integrated unit 100 includes a bore 110 extending between the fuel supply passageway 64 and the throughbore 106. The bore 110 is adapted to receive a portion of the fuel metering valve 66.

Still referring to FIGS. 2 and 3, a fuel distribution nozzle 112 has an interior chamber open at one end to the bore 110 in the integrated unit 100. A plurality of ports 114 are provided through the nozzle 112 such that the ports 114 face downstream from the nozzle 112. Thus, fuel flow through the fuel metering valve 66 flows into the interior of the nozzle 112 and then through the nozzle openings 114 into the air flow through the passageway 106.

As best shown in FIG. 3, the mass air flow sensor is preferably a hot wire mass air flow sensor having a body portion 116 in which the hot wire is mounted. Furthermore, the body 116 is mounted directly before and in alignment with the nozzle 112 so that air flow through the body 116 impinges upon the nozzle 112 and flows over the nozzle 112 as indicated by arrows 118. This turbulent flow of the air after passing through the sensor body 116 enhances the intermixing of the air and fuel to provide a more homogenous air/fuel supply to the engine.

As shown in FIGS. 1 and 2, the mass gas flow sensor 70 is positioned immediately upstream from the fuel metering valve 66. Furthermore, when the fuel metering valve 66 is operated in a fuel injection mode, i.e. the valve 66 is opened and closed in synchronism with the engine combustion of the engine cylinders, back pressures in the fuel supply passageway 64 can result. Such back pressures in turn result in inaccurate output signals from the mass gas flow sensor 70.

Figure 4B:
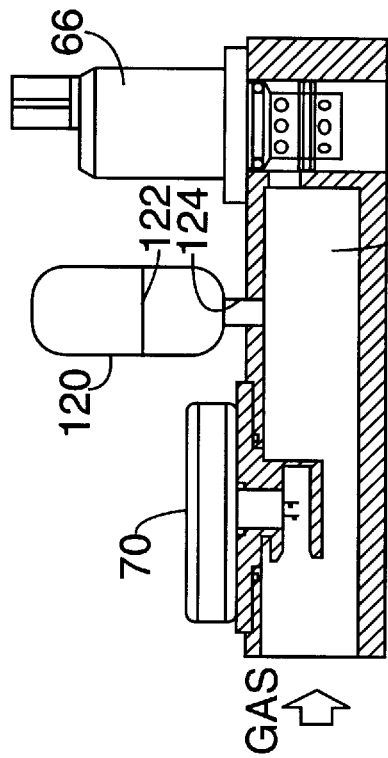
FIG. 4a–4d are diagrammatic views illustrating an improved mass fuel flow sensor and metering valve.
Figure 4D:
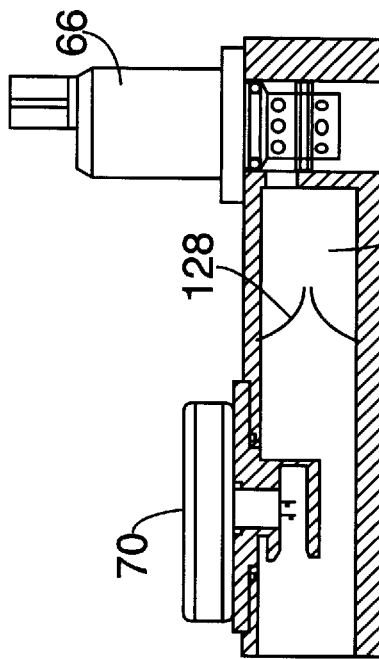
Figure 4A:
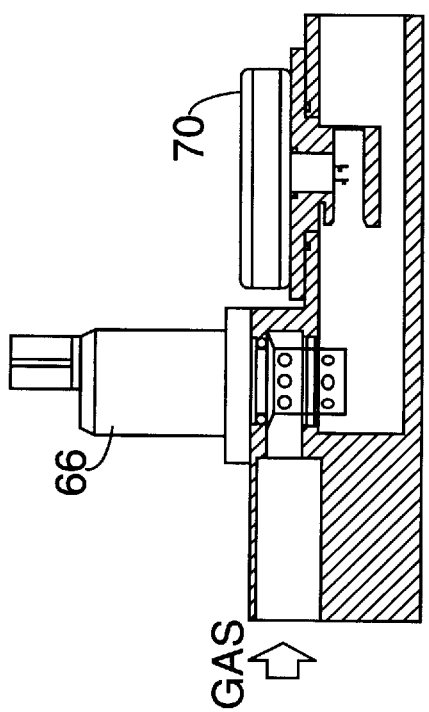

As best shown in FIG. 4a, in order to minimize inaccurate output signal from the mass gas flow sensor 70 caused by opening and closure of the fuel metering valve 66, especially in a fuel injection mode, the mass gas flow sensor 70 can be positioned downstream from the metering valve 66 as shown in FIG. 4a. In doing so, back pressures are not transmitted to the mass gas flow sensor 70 by the opening and closure of the valve 66 thus minimizing erratic output signals from the mass gas flow sensor 70.

Alternatively, as shown in FIG. 4b, a fuel accumulator 120 having a flexible diaphragm 122 is positioned so that one side of the diaphragm 122 is in fluid communication through an opening 124 to the fuel supply passageway 64 between the mass gas flow sensor 70 and the fuel metering valve 66. The fuel accumulator 20 thus absorbs or dampens pressure fluctuations caused in the fuel supply passageway 64 by the opening and closure of the fuel metering valve 66 thus preventing erratic output signals from the mass gas flow sensor 70.

Figure 4C:
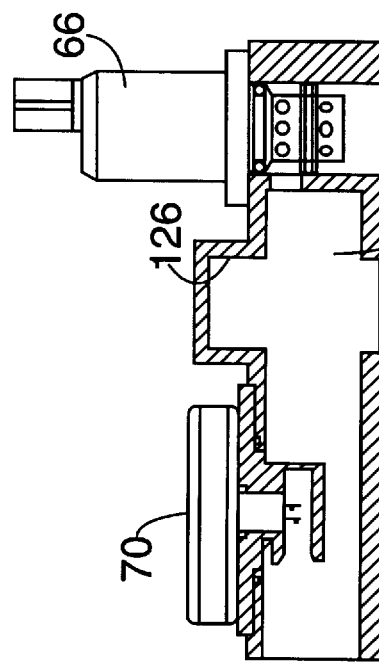

Alternatively, as shown in FIG. 4c, an increased volume chamber or surge tank 126 is operatively positioned between the mass gas flow sensor 70 and the fuel metering valve 66 in the fuel supply passageway 64. The expanded volume chamber 126, like the fuel accumulator 120 of FIG. 4b, absorbs or dampens pressure fluctuations resulting from opening and closure of the fuel metering valve 66. In doing so, erratic output signals from the mass gas flow sensor 70 are eliminated or, at least, minimized.

Still a further method of minimizing erratic signals from the mass gas flow sensor 70 caused by the opening and closure of the fuel metering valve 66 is illustrated in FIG. 4d. In FIG. 4d, a one way check valve 128 is positioned in the fuel supply passageway 64 between the mass gas flow sensor 70 and fuel metering valve 66. The check valve 128 permits gas flow only in the direction from the mass gas flow sensor 70 toward the metering valve 66 and thus prevents back pressures caused by closure of the valve 66 from affecting the mass gas flow sensor 70.

Referring again to FIG. 1, the cause of a decrease in volumetric efficiency is that the temperature of the gaseous fuel from the gaseous fuel source 60 varies depending upon any of a number of conditions. In order to minimize the effects of such temperature variation of the gaseous fuel, preferably a heat exchanger 120 is connected in series between the fuel source 60 and the fuel supply passageway 64. The heat exchanger 130 cools the fuel from the source 60 to a substantially constant temperature during operation of the engine. This constant temperature, however, may vary depending upon ambient operating conditions.

With reference now to FIG. 5, the fuel metering valve 66 is there shown in greater details and includes a housing 132 defining a fuel inlet chamber 134. The fuel inlet chamber 134 is open via port 136 to the fuel supply passageway 64 (see FIG. 2) while outlet ports 138 in the housing 132 are open to the air intake passageway via the fuel nozzle 112 (FIG. 2), Suitable seals, such as O-rings 140, fluidly seal the valve housing 132 to the integrated unit 100 (FIG. 2).

An elongated valve member 142 having a valve head 144 is longitudinally slidably mounted within the housing 132 and fluidly cooperates with a valve seat 146 in the housing 132. Thus, with the valve head 144 moved to its closed position illustrated in FIG. 5, fluid flow through the valve seat 146, and thus from the port 136 to the port 138, is prohibited or at least minimized. Conversely, with the valve head 144 retracted from the valve seat 146, freer fluid communication, and thus fuel supply to the engine, is established between the ports 136 and 138.

The end of the valve member 162 opposite from the valve head 144 is mechanically connected to a flexible diaphragm 150. The diaphragm 150 divides the housing chamber 134 into a main chamber 152 and a control chamber 154. A small compression spring 156 normally urges the diaphragm 150 with its attached valve member 144 towards a closed position. However, the pressure differential between the main chamber 152 and control chamber 154 controls the degree of opening of the valve 66 and thus the amount of fuel supplied to the engine.

In order to create the differential pressure between the control chamber 154 and main chamber 152, a leakage orifice 157 is provided through the diaphragm 150 so that pressure from the main chamber 152 passes through the leak orifice 157 and pressurizes the control chamber 154. Additionally, an elongated fluid passageway 160 is formed through the valve member 162 so that one end 181 of the passageway 160 is open to and senses the pressure in the air intake passageway. Conversely, the other end 164 of the passageway 160 is open to the control chamber 154.

In order to control the differential pressure between the control chamber 154 and main chamber 152, and thus the position of the diaphragm 150 with its attached valve member 162, the metering valve 66 includes a solenoid coil 170 which operatively controls the position of a plunger 172. One end 174 of the plunger 172 is aligned with the end 164 of the passageway 160 and, depending upon the position of the plunger 172, variably opens or altogether closes the passageway 160. The actual position of the plunger 172, furthermore, is controlled by the ECU 42 (FIG. 1) via its output signals on line 74.

In operation, activation of the solenoid 170 which moves the plunger 172 away from the valve member 162, opens the passageway 160, and establishes substantially free and unrestricted flow of relatively high pressure fuel in the control chamber 154, through the passageway 160 and to the relatively low pressure present in the air intake passageway 38. In doing so, the pressure in the control chamber 154 is lowered relative to the pressure in the main chamber 152 thus causing the diaphragm 150 and its attached valve 162 to move towards the solenoid 170 thus opening the valve member 142 and increasing the fuel flow to the engine.

Conversely, movement of the plunger 172 by the solenoid 170 (or by movement of the diaphragm 150) so that the plunger 172 closes the passageway 164 prohibits the flow of fuel through the passageway 160 and to the air intake passageway 38. When this occurs, the increased pressure in the main chamber 152 enters the control chamber 154 via the leak orifice 157 thus causing the pressure in the control chamber 154 to increase. Increased pressure in the control chamber 154 in turn moves the diaphragm 150 with its attached valve member 162 towards its closed position.

The actual degree of closure or opening of the passageway 160 by the plunger 172 controls the rate at which the valve 162 is opened or closed. An equilibrium point, of course, exists where the passageway 160 is partially open by the plunger 172 thus maintaining the valve member 162 at its instantaneous position. Damping material 142 is added to reduce the vibration of the valve member 162.

Thus, the fuel metering valve 66 of the present invention achieves several advantages over the previously known devices. In particular, unlike the previously known fuel metering valves, the fuel metering valve 66 of the present invention does not utilize the electrically operated solenoid to actually move the valve member 142 between its open and closed position. Instead, the solenoid 170 merely moves the plunger 172 to control the pressure balance across the diaphragm 150 thus conserving electrical energy.

A still further advantage of the metering valve of the present invention is that the end 181 of the passageway 160 senses the pressure in the air intake passageway. This pressure will vary depending upon the particular engine operating condition, e.g. wide open throttle, cruise, deceleration, and the like. Consequently, the fuel metering valve 66 automatically compensates for variations of the pressure of the air intake passageway 38 unlike the previously known solenoid fuel supply valves which operated independently of the pressure in the air intake passageway.

Figure 6A:
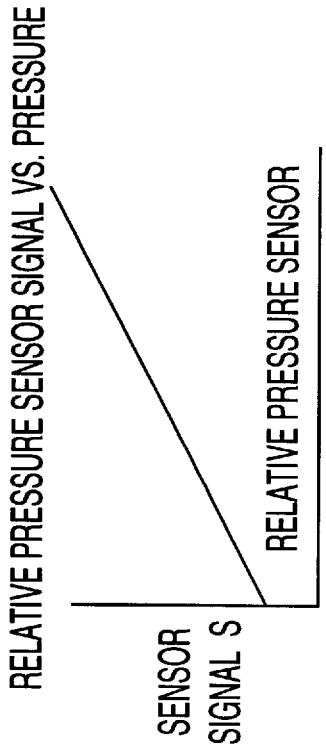
FIG. 6a is a graph illustrating the pressure output from an absolute pressure sensor signal.
Figure 6B:
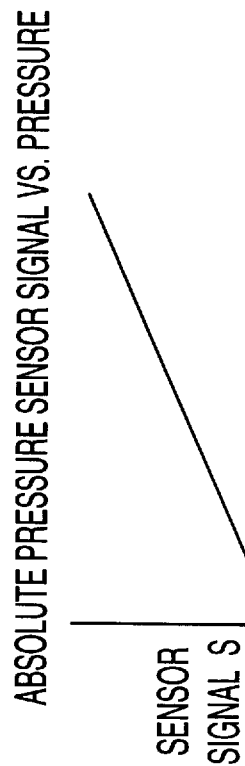
FIG. 6b is a graph illustrating the output from a relative pressure sensor.

In still a further embodiment of the present invention, a pressure transducer 180 (FIG. 1) provides an output signal to the ECU 42 representative of the cylinder pressure. The pressure sensor 180 can be of either the absolute pressure sensor type or the relative pressure sensor type. As shown in FIG. 6a, for an absolute pressure sensor, the sensor signal output S varies substantially linearly with the cylinder pressure P. Conversely, as shown in FIG. 6b, for a relative pressure sensor, the sensor output signal S varies substantially linearly with respect to the differential pressure dP/dt.

Figure 6C:
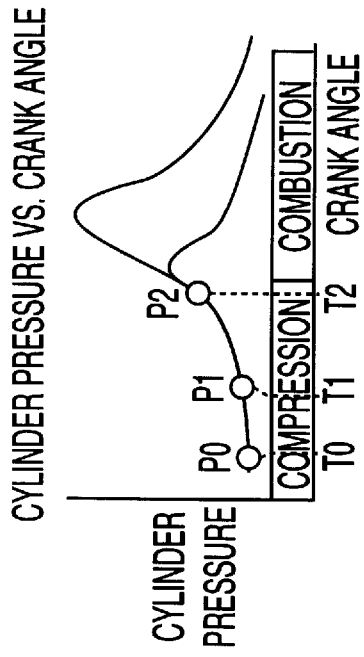
FIG. 6c is a graph illustrating the cylinder pressure during the compression/combustion cycle.
Figure 7:
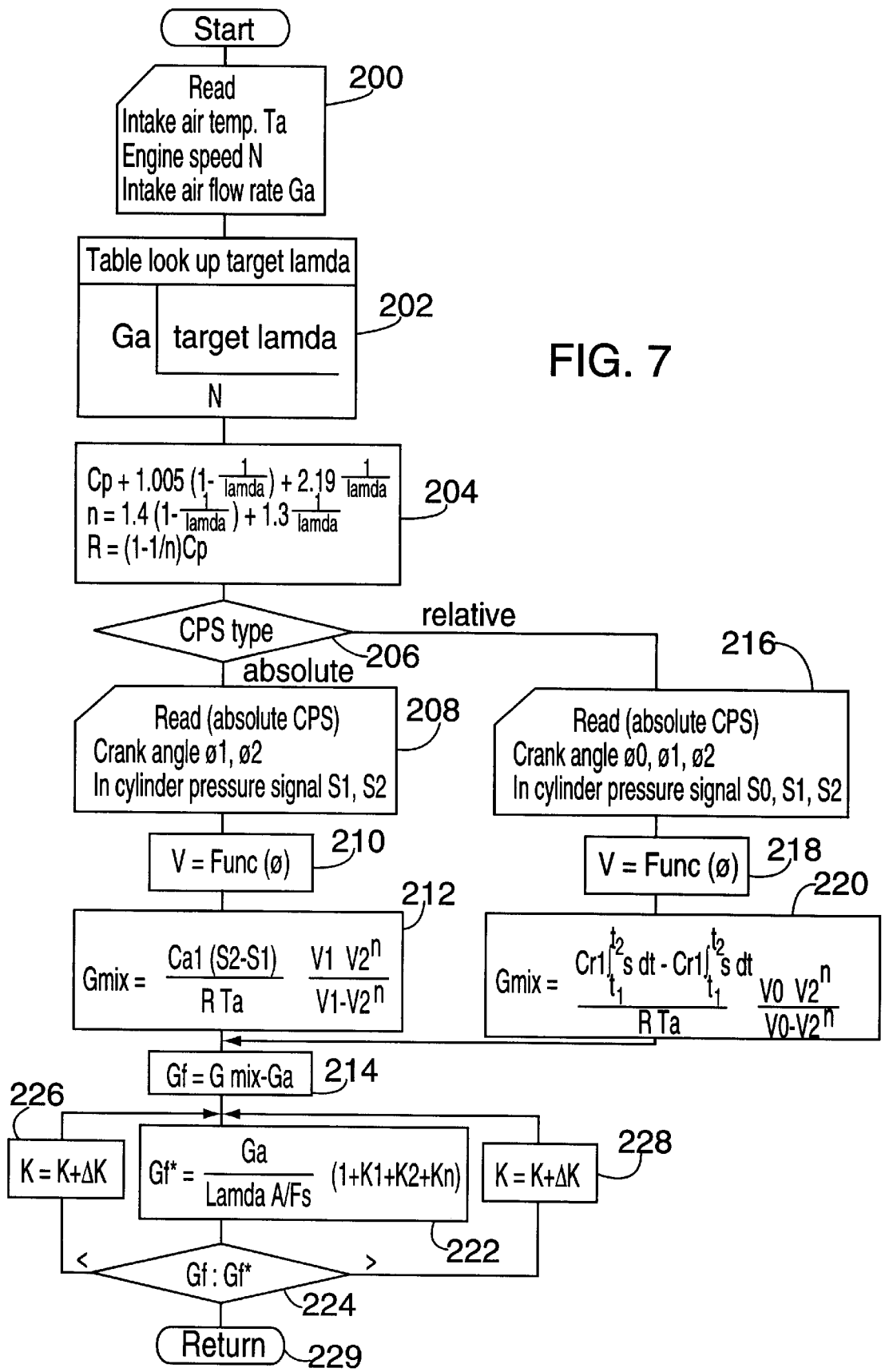
FIG. 7 is a flow chart illustrating the operation of the fuel management system utilizing a cylinder pressure sensor.

With reference to FIG. 6c, an exemplary graph of the cylinder pressure as a function of the engine stroke is illustrated. The pressure $P_0$–$P_2$ increases during the compression cycle for the engine cylinder. After engine ignition, at or near top dead center, the cylinder pressure increases dramatically providing the driving force for the engine and then rapidly decreases. Following the exhaust and intake cycle, the compression and combustion cycle illustrated in FIG. 7 are repeated.

The mass gas flow rate for the air/fuel mixture $G_{mix}$ is calculated in accordance with the following formula:

$$G_{mix}=(P_2-P_1)(V_1V_2^n)/(R_1T_1)(V_1-V_2^n) \tag{1}$$

Where:
$P_1$ and $P_2$=the in-cylinder pressures at time $t_1$ and $t_2$ (FIG. 6c);
$V_1$ and $V_2$=the in-cylinder volumes at times $t_1$ and $t_2$ (FIG. 6c);
$R_1$=gas constant of the mixture;
$T_1$=gas temperature.
The variable n is calculated as follows:

$$n = 1.4\left(1-\frac{1}{\lambda}\right) + 1.3/\lambda \tag{2}$$

where
λ=excess air ratio $$= \frac{A/F}{(A/F)_S}$$

where
$(A/F)_s$=stoichiometric air/fuel ratio
A/F=actual air/fuel ratio
Where an absolute pressure type sensor is utilized such that the pressure sensor output provides an output signal illustrated in FIG. 6a, the absolute pressure is calculated in accordance with the following formula:

$$P=Ca_1S+Ca_2 \tag{3}$$

Where:
P=absolute pressure;
S=sensor signal;
$Ca_1$, $Ca_2$ equal constants.
Combining the above two formulae together yield a calculation for the mass gas flow of the air/fuel mixture as follows:

$$G_{mix}=Ca_1(S_2-S_1)(V_1V_2^n)/(R_1T_1)(V_1-V_2^n) \tag{4}$$

Where a relative type pressure sensor is utilized of the type which produces an output signal of the type illustrated in FIG. 6b, the mass gas flow of the mixture $G_{mix}$ is determined differently. In particular, the sensor output signal is represented by the following formula:

$$dP/dt=Cr_1S+Cr_2 \tag{5}$$

Where:
S equals sensor output signal; and
$Cr_1$ and $Cr_2$ equal constants.
The pressure $P_1$ and $P_2$ are then determined as follows:

$$P_1=P_0\int_{t0}^{t1}+(dP/dt)dt \tag{6}$$

Where $P_0$, $P_1$ and $P_2$ equal the cylinder pressure at times $t_0$, $t_1$ and $t_2$, respectively (see FIG. 6c). Unlike the absolute pressure sensor, a third pressure reading $P_0$ $$P_2=P_1+\int_{t1}^{t2}(dP/dt)dt$$

is required to eliminate the sensor bias.
Combining the above equations together, the differential between $P_2$ and $P_0$ is determined as follows:

$$P_2 - P_1 = \int_{t1}^{t2}(dP/dt)dt - \int_{t0}^{t1}(dP/dt)dt \tag{7}$$
$$= Cr1\int_{t1}^{t2} s\, dt - Cr1\int_{t0}^{t1} s\, dt$$

Substituting the pressure differential of $P_2$–$P_1$, the mass gas flow rate of the mixture $G_{mix}$ is then calculated as follows:

$$G_{mix}=(Cr1\int_{t1}^{t2}s\,dt-Cr1\int_{t1}^{t2}s\,dt)(V0V2^n)/(R_1T1)(V_0-V2^n) \tag{8}$$

In determining the mass gas flow of the mixture $G_{mix}$, the specific heat $C_p$, $n=C_p/C_v$ and the gas constant $R_1$ are calculated by the following equations since these parameters are effected by the air/fuel ratio lambda:

$Cp=1.005(1-1/\lambda)+2.19/\lambda$ $n=1.4(1-1/\lambda)+1.31/\lambda$ $R_1=(1-1/n)Cp$ λ=excess air ratio—see Eq. 2

The utilization of the pressure sensor, either absolute or relative, as described above effectively enables either the mass gas flow sensor 70 (FIG. 1) or mass air flow sensor 72 (FIG. 1) to be effectively eliminated. More specifically, assuming that the mass fuel flow sensor 70 is eliminated, the gas flow rate of the fuel is calculated as follows:

$$G_f = G_{mix} - G_a \quad (9)$$

Where:

$G_f$=the mass fuel flow;

$G_{mix}$=the mass gas flow calculated in accordance with the output from the pressure sensor; and $G_a$=the mass air flow as detected by the mass air flow sensor 72.

Similarly, the mass air flow sensor 72 could alternatively be eliminated whereupon the mass air flow is determined in accordance with the following formula:

$$G_a = G_{mix} - G_f \quad (10)$$

With reference now to FIG. 7, a flow chart illustrating the use of the cylinder pressure sensor is there illustrated and with the assumption that the gas flow through sensor 70 has been eliminated while the mass air flow sensor 72 has been retained. At step 200, the ECU 42 (FIG. 1) first reads the value of the intake air temperature $T_a$, the engine speed N and the intake air flow rate $G_a$. Step 200 then proceeds to step 202.

At step 202, the ECU utilizes a look up table or equivalent means to determine a target air fuel ratio ($\lambda$) as a function of both engine speed and the mass air flow rate. Step 202 then branches to step 204 where the specific heat $C_p$, n and $R_1$ are calculated. Step 204 then branches to step 206. At step 206, the ECU 42 determines whether an absolute or relative type of pressure sensor is utilized to determine the cylinder pressure. Assuming that an absolute pressure sensor is utilized, step 206 branches to step 208.

At step 208 the ECU reads the signal $S_1$ and $S_2$ from the pressure sensor at crank angle $\phi 1$ and $\phi 2$ which corresponds to times $T_1$ and $T_2$ (FIG. 7). Step 208 then branches to step 210 where the cylinder volume is calculated as a function of the crank angle $\phi$ at times $t_1$ and $t_2$ (FIG. 6c). Step 210 then proceeds to step 212.

At step 212, the mass gas flow of the mixture $G_{mix}$ is determined in the fashion previously described in Equation 4 for the absolute pressure sensor. Step 212 then branches to step 214 whereupon the mass fuel flow rate $G_f$ is calculated as described in Equation 9.

Conversely, if a relative type pressure sensor is utilized, step 206 instead branches to step 216 where the ECU 42 reads the sensor output signals $S_0$, $S_1$ and $S_2$ at crank angle $\phi 0$, $\phi 1$ and $\phi 2$ which correspond to times $t_0$, $t_1$ and $t_2$, respectively (see FIG. 6c). Step 218 then determines the volume of the cylinder as a function of the crank angle $\phi$ at times $t_0$, $t_1$ and $t_2$. Step 218 then branches to step 220. At step 220, the ECU 42 determines the mass gas flow rate of the mixture $G_{mix}$ in the previously described fashion (see Equation 8) and then branches to step 214 where the mass fuel flow rate is determined by subtracting the mass air flow rate $G_a$ as determined from the sensor 72 from the mass gas flow rate of the mixture $G_{mix}$ (see Equation 9).

At step 222, the target mass fuel flow rate $G_f^*$ is determined in accordance with the following formula:

$$G_f^* = \frac{Ga}{\lambda A/Fs} (1 + K1 + K2 + Kn)$$

Where:

K1, K2 . . . Kn equal constants.

Step 222 then branches to step 224 where the target mass gas flow rate $G_f^*$ is compared with the actual mass gas flow rate $G_f$ determined in step 214. If the target mass gas flow rate $G_f^*$ exceeds the actual mass gas flow rate $G_f$, step 222 branches to step 226 where the value of K is incremented by an amount $\Delta K$. Step 226 then branches back to step 222 where the target gas fuel flow rate $G_f^*$ is again recalculated.

Conversely, if the actual mass fuel flow rate $G_f$ exceeds the target rate $G_f^*$, step 224 instead branches to step 228 where the value of K is decremented by the amount $\Delta K$ and the target mass fuel flow rate $G_f^*$ is again calculated at step 222. In the event that the target mass gas fuel flow rate $G_f^*$ equals the actual fuel flow rate $G_f$ within a predetermined threshold range, step 224 branches to step 229 and returns.

From the foregoing, it can be seen that the utilization of a cylinder pressure sensor can effectively eliminate the necessity of one of the flow sensors 70 or 72. As such, an overall reduction in the cost of the fuel management system can be achieved.

As a still further feature of the fuel management system of the present invention, it is well known that the composition and density of gaseous fuels varies from one source to another since such gaseous fuels lack the standardization present, for example, for liquid gasoline. As such, it would be advantageous to calibrate the fuel management system for the specific composition or density of the gaseous fuel utilized by the engine since the mass gas flow to achieve stoichiometric combustion will vary from one source to the next, particularly from one geographical location or one season to another.

In order to achieve this, and as will be hereinafter described in greater detail, during a first predetermined engine operating condition after engine warm up, such as idle, the ECU 42 varies the pulse width of the fuel metering valve 66 (FIG. 1) such that the engine combustion dithers around stoichiometric engine combustion for a predetermined number of cycles or for a predetermined time period.

The actual point of stoichiometric combustion is determined by the ECU 42 from the input signal from the oxygen sensor 50 (FIG. 1) which generates a predetermined output signal at stoichiometric combustion. Furthermore, at each point of stoichiometric combustion, the ECU 42 stores the ratio of the values of the mass air and fuel flow rates as determined by the mass air flow sensor and mass fuel flow sensor and, following the completion of the predetermined number of cycles or predetermined time period, for example fifteen seconds, determines the average mass air/fuel ratio at stoichiometric combustion by averaging the stored values for ratios of the mass air and fuel flow rates. This empirically determined value for the mass air/fuel ratio at stoichiometry is then utilized by the ECU to determine the mass fuel flow rate to achieve any target air/fuel mixture, including lean burn engine operating conditions.

Figure 8:
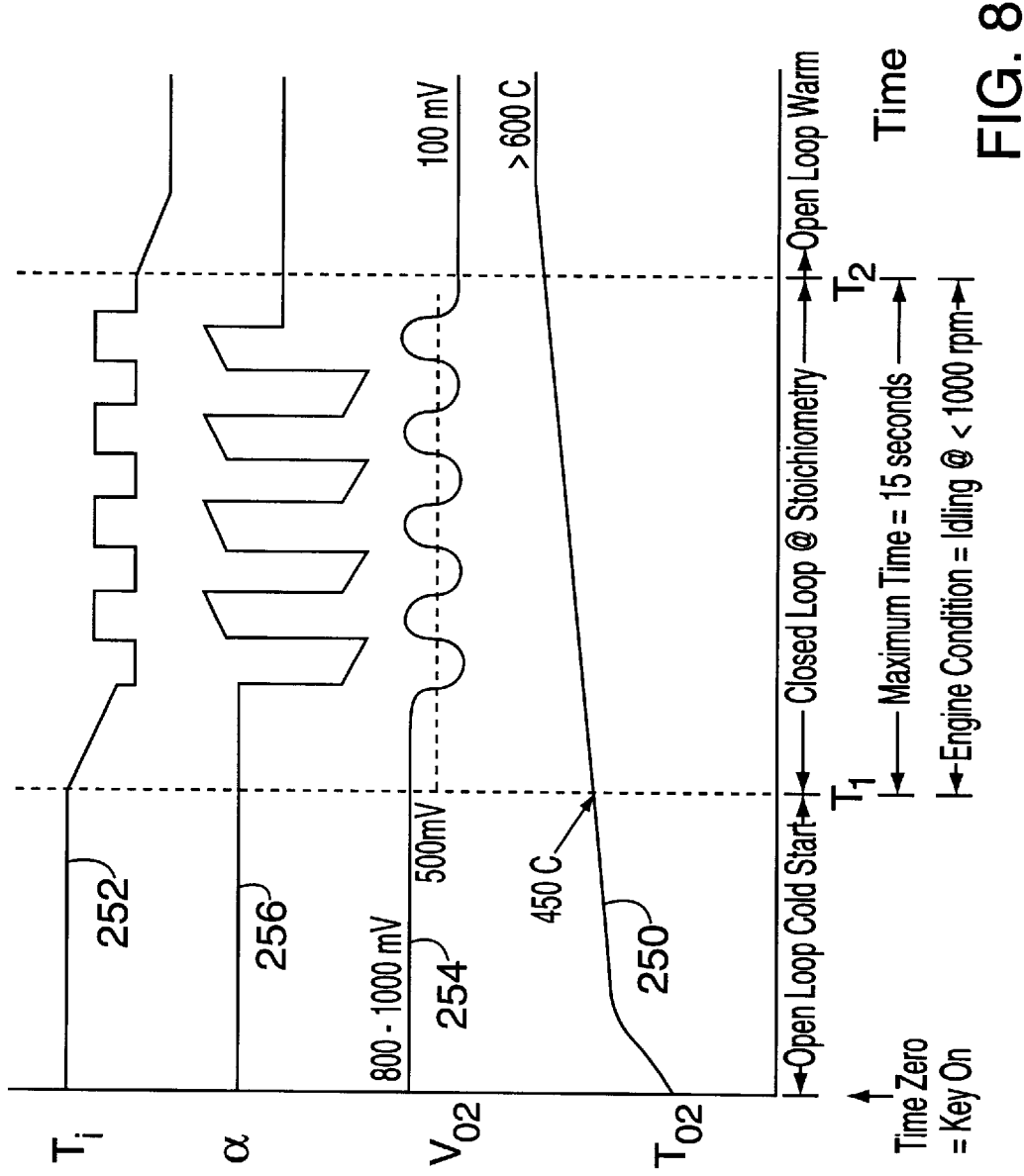
FIG. 8 is a graph depicting the operation of the fuel calibration method of the present invention.

With reference then to FIG. 8, the operation of the fuel calibration system of the present invention is there graphically illustrated in which graph 250 illustrates the temperature of the oxygen sensor 50. Since the oxygen sensor cannot operate accurately at temperatures below a predetermined level, e.g. 450° C., no calibration occurs until after engine warm up when the temperature of the oxygen sensor reaches its operational temperature at time $T_1$.

After time $T_1$, and when the engine begins a predetermined steady state engine operating condition, such as idle, the fuel pulse width $T_i$ is cyclically increased and decreased as indicated by graph 252 when the ECU 42 commands the engine combustion to dither around stoichiometric combustion. The stoichiometric combustion is determined from the output $V_{O2}$ from the oxygen sensor 50 as illustrated by graph 254. Since the oxygen sensor 50 generates a predetermined voltage output, for example 500 millivolts, at stoichiometric combustion, the transition points for stoichiometric combustion of the engine are determined by each crossing of the output $V_{O2}$ (graph 254) across the 500 millivolt threshold as indicated by graph 256. Furthermore, during each crossing of engine combustion across the point of stoichiometric combustion, the ECU 42 stores the sensor outputs in both the air flow sensor 72 and mass gas flow sensor 70 in its associated memory 46 (FIG. 1).

Following the expiration of a predetermined time period between time $T_1$ and time $T_2$, for example fifteen seconds, the ECU 42, utilizing the stored values from the sensors 70 and 72 then calculates an average mass air/fuel ratio indicative of stoichiometric combustion for the particular fuel supplied to the engine. This empirically determined value of the mass air/fuel ratio at stoichiometric combustion is then utilized by the fuel management system to determine the mass fuel flow rate to achieve its target air/fuel ratio after time $T_2$.

The calculation of the fuel pulse with $T_i$ illustrated in chart 252 during the dithering of the engine combustion about the point of stoichiometric combustion is determined as follows:

$$A/F = G_1/G_f \tag{11}$$

Where:

A/F=Actual measured air-fuel ratio $G_a$=Mass air flow rate measured by mass air flow sensor ($MT^{-1}$)

$G_f$=Mass fuel flow rate measured by mass gas flow sensor ($MT^{-1}$) or:

$$G_f = G_a/(A/F) \tag{11a}$$

$$\lambda_t = (A/F)/(A/F)_s$$

Where:

$\lambda_t$=Target lambda from lookup table $(A/F)_s$=Stoichiometric (chemically correct) air-fuel ratio or:

$$A/F = \lambda_t (A/F)_s \tag{12a}$$

At cold start, engine operation is open loop. Once the engine and the oxygen sensor are warmed up, closed loop stoichiometric operation is activated, and $(A/F)_s$ is measured directly using the mass air flow sensor and mass gas flow sensor at stoichiometry:

$$(A/F)_s = (G_a/G_f)_s \tag{13}$$

Since the actual A/F ratio is not measured in this system during lean operation, substitute the right side of Eqn. 12a for A/F in Eqn. 11a to determine the equation for fuel quantity under lean engine operation:

$$G_f = G_a/[\lambda_t(A/F)_s(N)] \tag{14}$$

Dividing both sides of Eqn. 4 by engine speed (N) yields:

$$G_f/N = G_a/[\lambda_t(A/F)_2(N)] \tag{15}$$

Where:

$G_f/N$=fuel mass in one engine cycle (M)

$$T_p = KG_a/N \tag{16}$$

Where:

$T_p$=Fuel pulsewidth supplied by $K_i$ fuel compensations (T)

K=Sum of $K_i$ multiplicative fuel quantity compensations ($T^3M^{-1}$)

Substituting for $G_f/N$ in Eqn. 15 from Eqn. 16:

$$T_p = [(K)(G_a)]/[\lambda_t(A/F)_s(N)](T) \tag{17}$$

Thereafter, after the oxygen sensor is operational, the pulsewidth $T_2$ at stoichiometry is calculated as follows:

$$T_i = T_p(1+K_1+K_2+K_3+\ldots+K_n)(1+\alpha)+T_s(T) \tag{18}$$

Where:

$T_i$=Total fuel pulsewidth supplied by $K_i$ fuel compensations (T)

$\alpha$=Oxygen sensor feedback parameter $T_s$=zero offset ($T_i>0$ when fuel mass=0)

Figure 9:
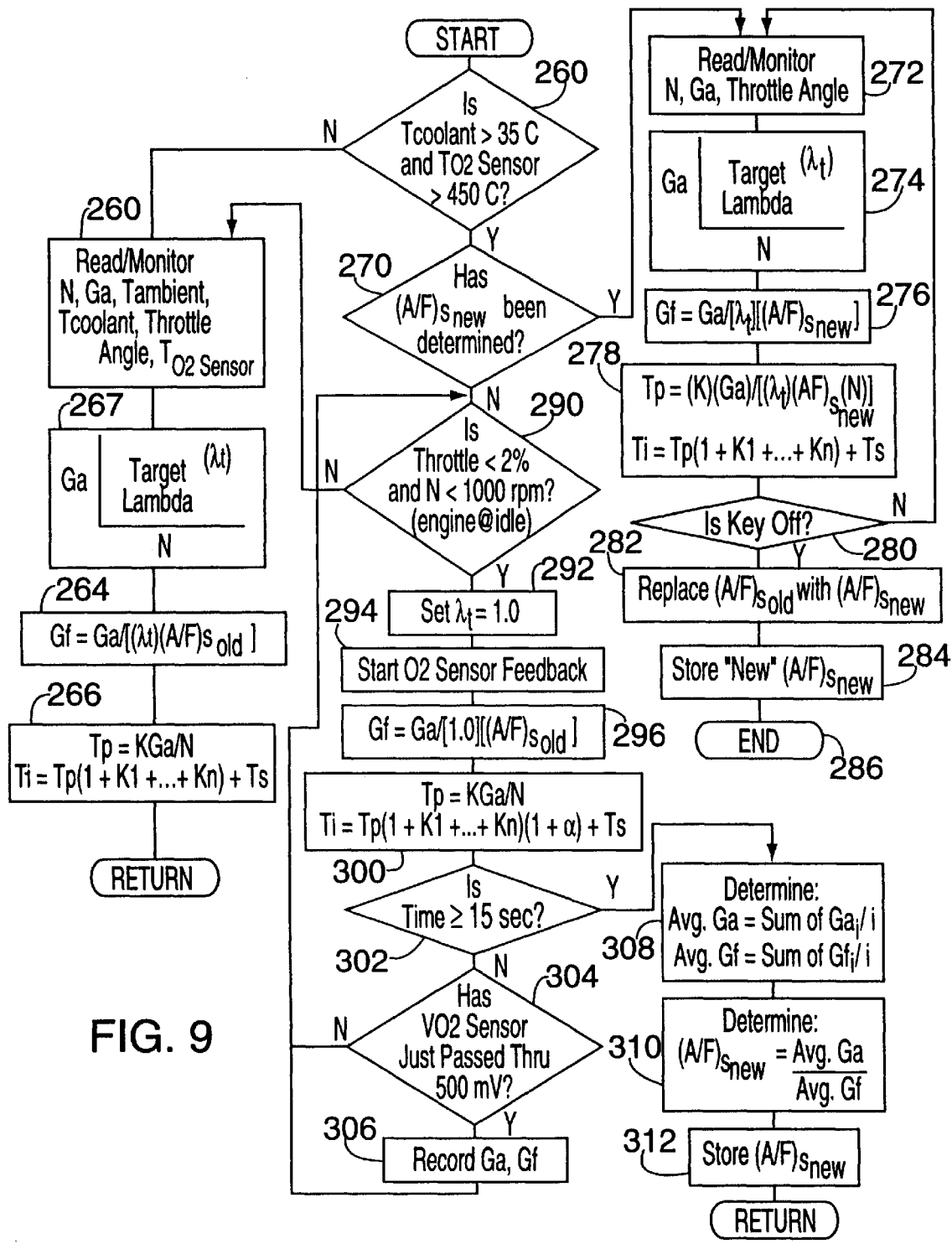
FIG. 9 is a flow chart illustrating the operation of the fuel calibration method.

With reference now to FIG. 9, a flow chart illustrating the operation of the fuel calibration for the fuel management system is there shown. At step 260, the ECU first determines if the engine has reached a warm up condition by comparing the outputs from the coolant sensor 52 and oxygen sensor 50 (FIG. 1) to preset constants. If the engine has not yet reached a warm up temperature, step 260 branches to step 262 where the ECU reads engine sensors representative of engine speed, mass air flow, ambient temperature, coolant temperature, throttle angle and the temperature of the oxygen sensor. Step 260 then branches to step 262 where a preset target lambda $\lambda_t$ is determined from a lookup table.

Step 262 then branches to step 264 where the mass fuel flow rate $G_f$ is calculated and then to step 266 where the fuel pulsewidth $T_i$ is calculated. Step 266 then returns to step 260.

Assuming that the engine has reached an engine warm up condition, step 260 instead branches to step 270 which determines if the fuel management system has already been calibrated to the particular fuel since the most recent engine ignition. If so, step 270 branches to step 272 where the engine speed, mass air flow and throttle angle are determined from their respective sensors. Step 272 then branches to step 274 where the target lambda $\lambda_t$ is determined from a lookup table.

Step 274 then branches to step 276 where the mass gas flow $G_f$ is calculated and then to step 278 where the fuel pulsewidth $T_i$ is calculated and then branches to step 280.

At step 280, the fuel management system determines if the key is still on. If so, indicative that the "trip" has continued, step 280 branches to step 272 where steps 272–278 are continuously iteratively repeated.

Conversely, if the key has been turned off, indicative that the trip has ended, step 280 instead branches to step 282 which replaces the old stoichiometric air/fuel ratio with the newly calibrated stoichiometric air/fuel ratio and step 284, stores the new calibrated stoichiometric air/fuel ratio as the old value and then ends at step 286.

Assuming, however, an initial operation of the engine after the key has been turned on but before the calibration graphically depicted in FIG. 8 has occurred, step 270 branches to step 290 which determines if the engine is in an idle engine condition. If not, 290 branches to step 260 whereupon the system utilizes a predetermined and fixed target lambda $\lambda_t$ from the lookup table in the fashion previously described.

On the other hand, if the engine is in an idle condition, step 290 instead branches to step 292 and sets the value of the target lambda at stoichiometric. Step 292 then branches to step 294 where the oxygen sensor feedback is initiated and then to step 296 where the mass fuel flow rate is calculated as a function of the previously stored stoichiometric air/fuel ratio.

Step 296 then branches to step 300 where the fuel pulsewidth $T_i$ is calculated as previously described in Equation 18 and then to step 302 where it is determined if the preset time period between time $T_1$ and time $T_2$ (FIG. 8) has elapsed. If not, step 302 branches to step 304 where the system determines if the voltage of the oxygen sensor (graph 254 in FIG. 8) has passed through the point of stoichiometric combustion. If so, the mass air flow rate $G_a$ and mass fuel flow rate $G_f$ are stored at step 306 and step 290 is again executed to determine if the engine is still in its idle condition.

Conversely, if the voltage output from the oxygen sensor has not passed to the point of stoichiometric combustion, step 304 instead branches directly back to step 290.

Assuming that the engine idle condition is maintained for the preset period of time between times $T_1$ and $T_2$ (which may be accumulated through successive idle conditions after engine warmup), step 302 at time $T_2$ branches to step 308 where the average value of the mass air flow $G_a$ and the average fuel flow of the fuel $G_f$ is determined by averaging the ratios of the values of $G_a$ and $G_f$ stored at the point of stoichiometric combustion at step 306. Step 310 then determines the new stoichiometric air/fuel ratio $(A/F)_{s\ new}$ by setting it equal to the average $G_a$ over the average $G_f$. Step 312 then stores the newly determined value $(A/F)_{s\ new}$ at step 312 and the fuel calibration is complete.

Thus, it can be seen that the present invention allows the mass fuel flow to be determined at the point of stoichiometric combustion despite differences in the composition, density and other factors of the particular gaseous fuel. Having determined the air/fuel ratio at stoichiometric combustion, the fuel management system is then able to utilize the empirically determined value for the mass fuel flow rate to achieve other target air/fuel ratios accurately, including lean burn operating conditions.

From the foregoing, it can be seen that the present invention provides a fuel management system for gaseous fuel internal combustion engines which achieves a number of advantages over the previously known systems.

In particular, the present invention provides a novel integrated air flow sensor and air/gas mixing unit which not only achieves improved air/fuel mixing, but also reduces the overall cost of the system.

An improved pressure balance fuel metering valve is also disclosed which not only utilizes pressure difference across the diaphragm to actuate the valve, but also minimizes the previously known adverse effects of variations of the pressure in the intake manifold.

An improved bypass valve for a turbocharger is also disclosed to minimize erratic output signals from the mass air flow sensor during an engine deceleration condition.

Similarly, a precooler is also provided for cooling the gaseous fuel prior to its introduction to the mass fuel flow sensor in order to enhance the accuracy of the output from the mass fuel flow sensor previously caused by variations of the temperature of the gaseous fuel.

The present invention also discloses an improved accumulator or similar means downstream from the mass fuel flow sensor in order to minimize erratic output signals from the mass fuel flow sensor caused by the opening and closure of the fuel metering valve when used in a fuel injection mode.

The fuel management system of the present invention also discloses the utilization of a pressure transducer, either relative or absolute, in the cylinder to determine the total mass of the charge (air+fuel) to the cylinder. From this, the utilization of the pressure sensor enables the elimination of one of the flow sensors.

A novel method of calibrating the fuel management system to the precise fuel present for the engine is also disclosed to compensate for differences in heat and energy content and other factors of the gaseous fuel.

Having described my invention, however, many modifications thereto will become apparent to those skilled in the art to which it pertains without deviation from the spirit of the invention as defined by the scope of the appended claims.

We claim:

1. For use with an internal combustion engine having an air intake passageway, a source of fuel, a fuel supply passageway extending between said fuel source and said air intake passageway and an exhaust passageway for combustion products from the engine, a fuel management system comprising:

a first sensor, said first sensor generating an output signal representative of a first engine operating condition;

a second sensor, said second flow sensor generating an output signal representative of a second engine operating condition;

means in said fuel supply passageway for controlling fuel delivery to the engine, a stoichiometric device positioned in the exhaust passageway, said stoichiometric device generating a distinguishable output at stoichiometric combustion of said engine;

an electronic control unit and means for coupling said output signals from said first and second sensors and said stoichiometric device as input signals to said electronic control unit, said electronic control unit having means for calculating the air/fuel ratio as a function of said input signals;

means responsive to an initial predetermined engine operating condition for actuating said fuel delivery control means so that the engine dithers about stoichiometric combustion;

means in said electronic control unit responsive to said distinguishable output from said stoichiometric device for storing said output signals from said first and second sensors each time said output signal from said stoichiometric device equals said distinguishable output;

means in said electronic control unit for averaging said stored output signals and for calculating an average stoichiometric air/fuel ratio therefrom; and means utilizing said calculated stoichiometric air/fuel ratio and input from one of said first or second sensors for thereafter actuating said fuel delivery control means to obtain a target air/fuel ratio.

2. The invention as defined in claim 1 wherein one of said sensors comprises a mass air flow sensor positioned in said air intake passageway which generates an output signal representative of the mass air flow through said air intake passageway.

3. The invention as defined in claim 2 wherein said fuel is a gaseous fuel and wherein one of said sensors comprises a mass fuel flow sensor positioned in said fuel supply passageway which generates an output signal representative of the mass fuel flow through said fuel supply passageway.

4. The invention as defined in claim 2 wherein one of said sensors comprises a cylinder pressure sensor which generates an output signal representative of the cylinder pressure at times $t_1$ and $t_2$ and a crankshaft sensor which generates an output signal representative of the rotational position of an engine crankshaft at times $t_1$ and $t_2$.

5. The invention as defined in claim 1 wherein said target air/fuel ratio comprises an air/fuel ratio leaner than stoichiometric.

6. The invention as defined in claim 1 wherein said electronic control unit comprises a microprocessor.

7. The engine as defined in claim 1 wherein said predetermined engine operating condition comprises an engine idle condition after said engine reaches a predetermined temperature condition.

8. The invention as defined in claim 1 wherein said stoichiometric device comprises an oxygen sensor.

9. The invention as defined in claim 1 wherein said engine dithers about stoichiometric combustion for a predetermined time period.

10. The invention as defined in claim 1 wherein said engine dithers about stoichiometric combustion for a predetermined number of engine cycles.

11. The invention as described in claim 4 wherein said electronic control unit having means for calculating the mass flow of the air plus fuel mixture, $G_{mix}$, to the engine cylinder(s) as a function of said input signals in accordance with the following formula:

$$G_{mix}=(P_2-P_1)(V_1V_2^n)/(R_1T_1)(V_1-V_2^n)$$

wherein:
P$_1$ and P$_2$=the in-cylinder pressures at times $t_1$ and $t_2$, respectively;
V$_1$ and V$_2$=the in-cylinder volumes at times $t_1$ and $t_2$, respectively;
R$_1$=gas constant of the mixture;
T$_1$=gas temperature
and the variable n is calculated as follows:

$$n=1.4(1-1/\lambda)+1.3/\lambda$$

wherein
X=excess air ratio $$=\frac{A/F}{(A/F)_S}$$

wherein
(A/F)$_S$=stoichiometric air/fuel ratio
A/F=actual air/fuel ratio;
means in said electronic control unit responsive to said distinguishable output from said stoichiometric device for storing the output signals from said cylinder pressure sensor and the other of said sensors each time said output signal from said stoichiometric device equals said distinguishable output.

12. The invention as defined in claim 11 wherein the other of said first and second sensors generates an output signal, $G_a$, representative of the mass air flow through said air intake passageway, and said electronic control unit has a means for calculating the mass fuel flow, $G_f$, in accordance with the following formula:

$$G_f=G_{mix}-G_a.$$

13. The invention as defined in claim 11 wherein the other of said first and second sensors generates an output signal, $G_f$, representative of the mass fuel flow through said fuel supply passageway, and said electronic control unit has a means for calculating the mass air flow, $G_a$, in accordance with the following formula:

$$G_a=G_{mix}-G_f.$$

14. The invention as defined in claim 4 wherein said cylinder pressure sensor comprises an absolute pressure sensor which generates a substantially linear signal with respect to the absolute pressure in the cylinder.

15. The invention as defined in claim 4 wherein said cylinder pressure sensor comprises a relative pressure sensor which generates a substantially linear signal with respect to the pressure change in the cylinder.

* * * * *

UNITED STATES PATENT AND TRADEMARK OFFICE
CERTIFICATE OF CORRECTION

PATENT NO. : 5,806,490
DATED : September 15, 1998
INVENTOR(S) : Toshiharu Nogi, et al.

It is certified that error appears in the above-identified patent and that said Letters Patent is hereby corrected as shown below:

Column 2, line 21, delete "." and insert --,--.

Column 2, line 21 and 22, delete "Because gas' volume is changed by the temperature as opposed to liquid fuel." and insert --because the volume of gas changes as a function of temperature whereas liquid fuel does not.--.

Signed and Sealed this

Sixteenth Day of March, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,806,490
DATED : September 15, 1998
INVENTOR(S) : Toshiharu Nogi, Robert I. Bruetsch It is certified that error appears in the above-identified patent and that said Letters Patent is hereby corrected as shown below:

Column 7, line 64, delete "(FIG. 2)," and insert --(FIG. 2).--.
Column 10, line 55, formula 8, delete the second occurrence of "$t1^{t2}$" and insert --$t0^{t1}$--.
Column 10, line 55, formula 8, delete "(Vo-V2")" and insert --(VO-V2")--.
Column 13, line 33, formula 11, delete "$G_1G_f$" and insert --$G_aG_f$--.
Column 13, line 50, formula 12a, delete "$\lambda_f$" and insert --$\lambda_t$--.
Column 16, line 30, delete the word "flow".
Column 18, line 3, delete "X" and insert --$\lambda$--.
Title page, [56] "Other Publications", delete "S.H. Smith" and insert --D.H. Smith--.

[56] "U.S. Patent Documents", insert the following references:
| | | | |
|---|---|---|---|
| 2,067,595 | 01/1937 | Browne et al. | 123/127 |
| 4,483,302 | 11/1984 | Mannessen | 123/527 |
| 4,494,515 | 01/1985 | Brown | 123/527 |
| 4,537,172 | 08/1985 | Kenehara et al. | 123/527 |
| 5,353,765 | 10/1994 | Saikalis et al. | 123/438 |
| 5,355,855 | 10/1994 | Saikalis et al. | 123/438 |

[56], "Foreign Patent Documents", insert the following reference:
0262259    12/1986    Europe Signed and Sealed this Thirteenth Day of July, 1999

Attest:

Q. TODD DICKINSON

*Attesting Officer*    *Acting Commissioner of Patents and Trademarks*